United States Patent [19]
Trueblood et al.

[11] Patent Number: 5,687,687
[45] Date of Patent: Nov. 18, 1997

[54] OIL LEVEL SENSOR SYSTEM

[75] Inventors: Jimmie J. Trueblood, Columbus; Mary L. Till, Indianapolis; Lynn S. Zopff, Columbus, all of Ind.; Bradly G. Duffer, Metamora, Ill.

[73] Assignee: Cummins Engine Company, Inc., Columbus, Ind.

[21] Appl. No.: 477,294

[22] Filed: Jun. 7, 1995

[51] Int. Cl.$^6$ ............................................. F01M 11/10
[52] U.S. Cl. ........................ 123/196 S; 340/450.3; 73/293
[58] Field of Search ........................ 123/196 S, 195 C; 73/293; 340/450, 450.3

[56] References Cited

U.S. PATENT DOCUMENTS

| | | |
|---|---|---|
| 4,306,525 | 12/1981 | Faxvog . |
| 4,522,167 | 6/1985 | Hurner ................. 123/196 S |
| 4,632,080 | 12/1986 | Hurner . |
| 4,694,793 | 9/1987 | Kawakita et al. . |
| 4,859,987 | 8/1989 | Markus ................. 340/450.3 |
| 4,887,068 | 12/1989 | Umehara ............... 340/450.3 |
| 5,046,583 | 9/1991 | Sasaki et al. ......... 340/450.3 |
| 5,053,745 | 10/1991 | Sasaki et al. ......... 340/450.3 |
| 5,103,648 | 4/1992 | Barbier ................. 73/293 |
| 5,257,539 | 11/1993 | Gale et al. ............ 123/196 S |
| 5,298,881 | 3/1994 | Bowman ............... 340/450.3 |

FOREIGN PATENT DOCUMENTS

| | | | |
|---|---|---|---|
| 3708997 | 10/1988 | Germany | 123/196 S |
| 5280322 | 10/1993 | Japan | 123/196 S |
| 5280031 | 11/1993 | Japan | 123/196 S |

*Primary Examiner*—Erick R. Solis
*Attorney, Agent, or Firm*—Woodard, Emhardt, Naughton, Moriarty & McNett

[57] ABSTRACT

A fluid level sensor system for a vehicle oil pan includes a fluid level sensor assembled to the oil pan which has a first LED/phototransistor sensor electrically arranged and responsive to a low oil level in the oil pan for generating a low level voltage signal. The fluid level sensor also includes a second LED/phototransistor sensor which is electrically arranged and responsive to a high oil level in the oil pan for generating a high level voltage signal. The low level voltage signal and the high level voltage signal from the fluid level sensor are electrically connected to an electronic control module (ECM) which receives and processes the two signals and activates a warning lamp with a flashing illumination to identify a low oil level condition and a constantly on illumination to identify a high oil level condition. The operation of the ECM is controlled by a flow logic algorithm.

15 Claims, 4 Drawing Sheets

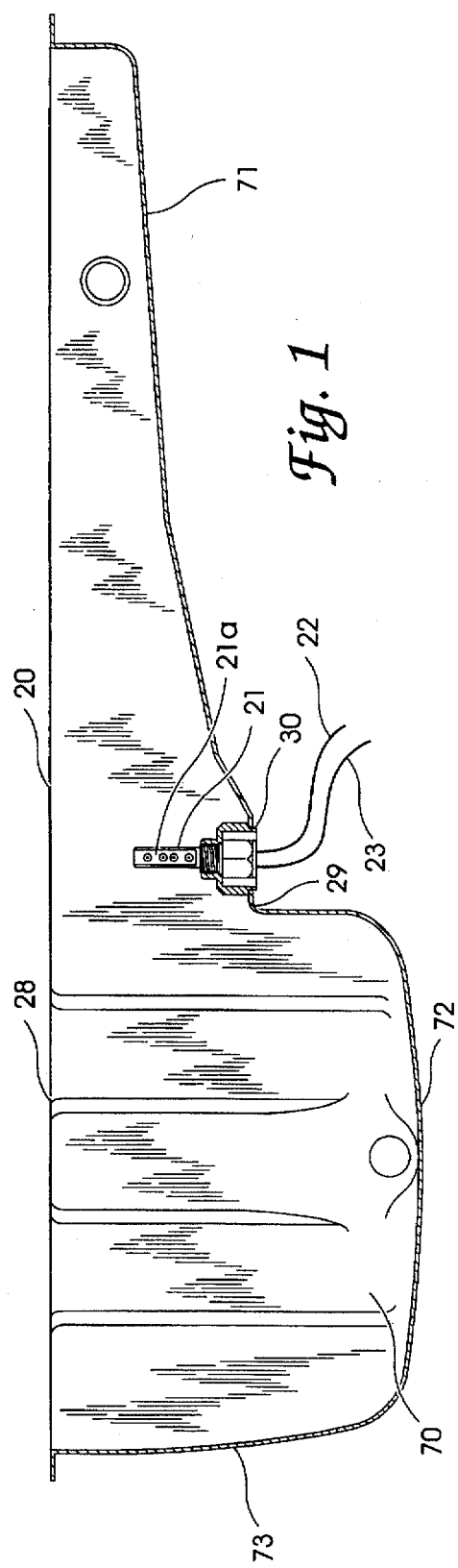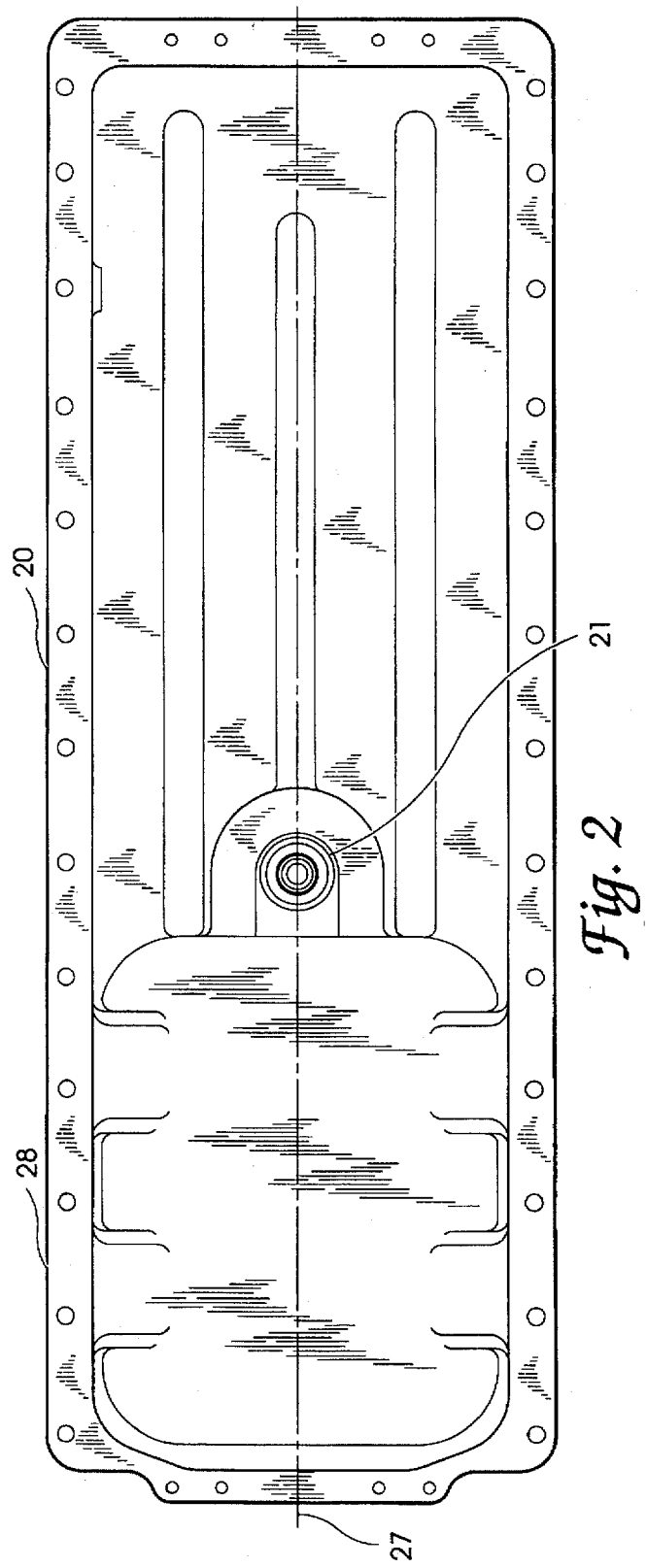

OIL LEVEL SENSOR SYSTEM

BACKGROUND OF THE INVENTION

The present invention relates in general to fluid level sensing in the fluid reservoirs of vehicles and similar equipment. More particularly the present invention relates to the combined sensing of both low and high fluid levels and the corresponding generation of a different warning signal for each condition. The invention is also able to be arranged for monitoring fluid consumption of the fluid in the reservoir.

Focusing more specifically on a motor vehicle and in particular on a diesel engine driven vehicle, virtually all of the fluid levels are monitored with sensors and gauges in order to indicate the current status of the fluid level. In a few instances the operator of the vehicle is really only concerned when the fluid level is too low and normally is not interested in the actual fluid level. For example, the actual oil level is not particularly important so long as the operator gets a warning indication when the oil level is too low for safe operation of the vehicle. Whenever engine or vehicle performance could be affected if the low fluid level is left uncorrected, the fluid level needs to be sensed and normally the operator needs or prefers to have some type of an in-cab warning.

Often there is little concern with a high fluid level because the excess fluid simply spills out onto the pavement. Obviously when a fixed-volume chamber is being filled with a fluid, it is easy to tell (visually) when its capacity is reached. Arguably the chamber cannot be over-filled because when it is at its maximum volume, it is properly filled. Whatever additional amount of fluid might cause an over-filled condition never makes it into the chamber, it simply cascades onto the ground.

One exception to the various fixed-volume chambers is the oil pan reservoir. Since the oil pan reservoir is not "filled" with oil when it is at its normal or safe level, it has the capacity or capability of being over-filled. Although an oil level which is higher than normal might be regarded as insignificant or harmless, an inefficiency in engine performance has been observed when the oil level in the pan is too high. When the oil level is too high the counterweights and rods dip into the oil in the pan and add higher frictional horsepower to the engine operation. This additional frictional horsepower results in an inefficiency in the form of wasted fuel.

Traditional oil monitoring or fluid level sensing approaches are only concerned with determining when the oil level is too low because with a low level the engine is in danger of abrasive damage. The electronics of the vehicle (typically using an electronic control module or ECM) will generate a low oil signal from some style of oil pan sensor and an engine protection lamp in the cab or vehicle interior is then illuminated at the time the vehicle key is turned on.

Since it has been learned that a high oil level will result in an engine inefficiency in the form of wasted fuel, it would be an improvement to provide a sensor for a high fluid level as well as the corresponding electronics to provide a visual warning signal to the vehicle operator when the oil level is too high. Ideally the same warning lamp could be used with different modes of illumination depending on whether the oil level in the pan is too low or too high. It is also desirable to be able to monitor the consumption of oil from within the oil pan of the vehicle. The present invention addresses these current issues and provides a desirable improvement as a solution.

While it might be thought that it is a simple task to sense a high oil level, there are two key aspects to the present invention which help to account for the innovation and uniqueness of the design. First, it had to be recognized that a high oil level would result in an engine inefficiency and a reduction in fuel economy. Secondly, there had to be a way to determine where and how to mount the sensor in order to get an accurate or true reading of the oil level, taking into account factors such as front to rear and side to side tilt caused by road grade. Oil volume changes due to temperature also had to be considered. The design of a suitable sensor also had to take into consideration different oil pan sizes and pan geometries. How to assemble the sensor onto or into each oil pan was a further concern. Each of these issues were researched and the results reflected in the design of the present invention.

Over the years there have been a variety of fluid monitoring and sensing systems designed and the following list of patents are believed to be a representative sampling of these earlier designs:

| PATENT NO. | PATENTEE | ISSUE DATE |
| --- | --- | --- |
| 4,306,525 | Faxvog | Dec. 22, 1981 |
| 4,632,080 | Hurner | Dec. 30, 1986 |
| 4,694,793 | Kawakita et al. | Sep. 22, 1987 |

SUMMARY OF THE INVENTION

A fluid level sensor system operable to indicate either when the fluid level in a reservoir is below a predetermined low level limit or when the fluid level in the reservoir is above a predetermined high level limit according to one embodiment of the present invention comprises a fluid reservoir, a fluid level sensor assembled to said fluid reservoir and having first sensor means responsive to a low fluid level in the fluid reservoir for generating a first level signal and having second sensor means responsive to a high fluid level in the fluid reservoir for generating a second level signal, an electronic control module electrically connected to the fluid level sensor for receiving and processing the first and second signals, and a warning indicator electrically connected to the electronic control module for providing a first warning signal corresponding to the first level signal and a second warning signal corresponding to the second level signal, the first warning signal being different from the second warning signal so as to differentiate between a low level fault and a high level fault.

One object of the present invention is to provide an improved fluid level sensor system.

Related objects and advantages of the present invention will be apparent from the following description.

BRIEF DESCRIPTION OF THE DRAWINGS

FIG. 1 is a fragmentary, side elevational view of a fluid level sensor assembled into an oil pan in accordance with the present invention.

FIG. 2 is a top plan view of the FIG. 1 fluid level sensor as assembled into the FIG. 1 oil pan.

DESCRIPTION OF THE PREFERRED EMBODIMENT

Figure 3:
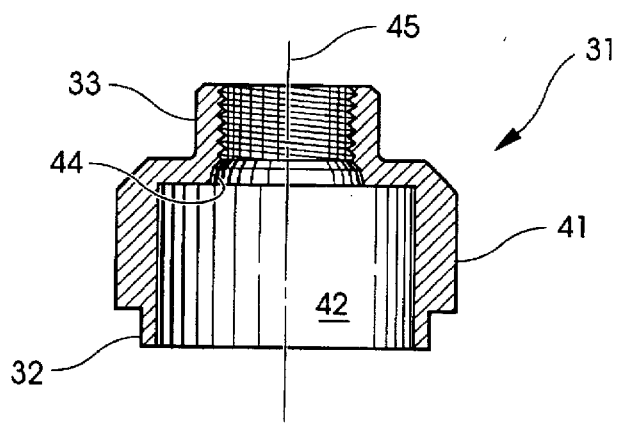
FIG. 3 is a side elevational view in full section of a mounting bushing comprising a portion of the FIG. 1 assembly according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIGS. 1 and 2 there is diagrammatically illustrated a vehicle oil pan 20 with a fluid level sensor 21 assembled into the oil pan at a predetermined location for sensing the oil level in the oil pan 20. The oil pan 20 is intended to represent a typical oil pan for use with a diesel engine even though different engine models or styles will often have oil pans with slightly different sizes and shapes. In the preferred embodiment of the present invention, the oil pan will have a defined or predetermined low oil level such as 7.5 gallons and a defined or predetermined high oil level such as 9.5 gallons. Electrical lines 22 and 23 are diagrammatically illustrated as coming from the sensor 21 so as to depict an electrical connection and communication with the sensor from an outside or exterior circuit. However, in the preferred embodiment an electrical connector will be used to power the sensor and to receive fluid level data from the sensor.

Figure 4:
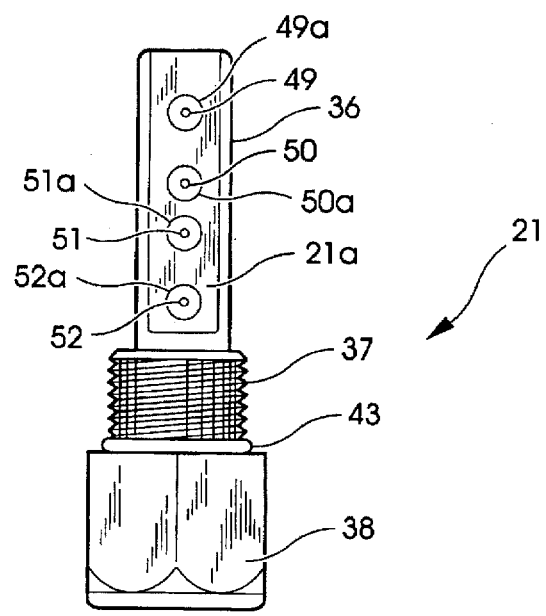
FIG. 4 is a side elevational view of the FIG. 1 fluid level sensor.

The sensing face or surface 21a which is directed outwardly from the plane of the paper includes a vertical series of light-emitting diodes (LEDs), each of which is surrounded by a cooperating receiving lens (see FIG. 4). Since the oil level in oil pan 20 would typically be viewed from any radial direction from the axial centerline of sensor 21, the particular direction of surface 21a is not critical. The FIG. 1 orientation of sensor 21 was selected merely for drawing clarity so that surface 21a could be seen relative to a side elevational view of oil pan 20.

As illustrated in FIG. 2, oil pan 20 has a generally rectangular appearance in the top plan view and the fluid level sensor is centered on longitudinal axis line 27. The top edge 28 is substantially flat and is horizontally level when there is no tilt or incline to the vehicle. When in use and without any tilt or incline to the vehicle, the crankshaft of the vehicle will have a horizontal orientation and the longitudinal axis of the crankshaft is substantially parallel to the horizontal surface defined by top edge 28. The acceptable static high oil level is approximately 12.5 inches (31.75 cm) below the top edge 28 of the oil pan 20. There is only a very slight clearance, typically less than 1 inch (2.54 cm), between the acceptable high oil level and the lowermost portion or edge of the crankshaft.

The assembly of sensor 21 into oil pan 20 involves first creating a mounting aperture 30 through the base wall 29 of the oil pan 20 at a predetermined location and then installing into that aperture 30 a mounting bushing 31 (see FIG. 3). A raised boss may also be formed in the base wall 29 of the oil pan for receipt of sensor 21 and bushing 31. The specific location in base wall 29 is important as will be described hereinafter. Aperture 30 is circular and measures approximately 1.82 inches (4.62 cm) in diameter. The mounting bushing 31 includes a lower stem portion 32 which is inserted into aperture 30. The bushing 31 is then welded in place to both anchor the bushing to the oil pan 20 and to seal their interface in order to prevent any fluid leakage through that interface. The mounting bushing 31 has an internally threaded upper stem portion 33 which threadedly receives fluid level sensor 21 (see FIG. 4).

The sensor 21 includes a sensor post 36 which includes surface 21a and which axially extends above externally threaded portion 37. Below the threaded portion 37 is a connector housing 38 which is constructed and arranged to mate with a Packard Electric connector, part No. 12047909. Threaded portion 37 mates with and within upper stem portion 33 of bushing 31 and this assembly arrangement positions the sensor post up into the interior of the oil pan 20 in a substantially vertical orientation relative to the horizontal orientation of the oil pan.

Referring again to FIG. 3, mounting bushing 31 includes a main body portion 41 positioned between the upper and lower stem portions 32 and 33, respectively. Central region 42 which is defined by the lower stem portion 32 and by main body portion 41 is cylindrical in shape and oversized so as to receive the connector housing 38. When the sensor 21 is properly installed in the bushing 31 the sensor O-ring 43 is compressed up against conical surface 44 at the upper end of the central region 42 in order to provide a fluid tight seal at that interface. This seal helps to prevent any leakage from the oil pan if the welded interface between the pan 20 and bushing 31 has any porosity. Bushing 31 is fabricated out of steel and all portions are concentric to each other and centered on vertical axis line 45.

Referring again to FIG. 4, sensor post 36 has a D-shaped lateral cross-section yielding a substantially flat surface 21a. Protruding out from surface 21a are four high powered infrared LEDs 49, 50, 51, and 52 which are each arranged in combination with a corresponding phototransistor 49a, 50a, 51a, and 52a. Each corresponding phototransistor functions as an optical receiver (lens) and is arranged so as to surround its corresponding LED. The number of axially spaced LED/phototransistor combinations is somewhat arbitrary depending on what sensing and measurements are desired. The operational theory involves each LED sending out a beam of light in a direction substantially normal to surface 21a. If some medium is encountered, such as oil, the beam of light is reflected back to the corresponding phototransistor (lens) and a corresponding voltage signal is generated.

If the fluid level is high enough for the top or uppermost LED/phototransistor combination to be triggered by reflected light, then each of the LED/phototransistor combinations which are disposed below the top combination will also be triggered. The result will be a cumulative voltage signal, the magnitude of which is used to determine the highest LED/phototransistor combination which is triggered. This will then indicate the approximate oil level in the pan. In the most basic arrangement there would be one combination for a low oil level indication and one LED/phototransistor combination for a high oil level indication. The axial separation between these two LED/phototransistor combinations is tied to the oil pan size and geometry relative to the gallon capacity for the predetermined low and high levels.

There is a maximum or total voltage available from sensor 21. This available voltage, for example four (4) volts, is equally divided or apportioned over the LED/phototransistor combinations which are incorporated into the selected sensor. If only two combinations are used, a low level signal would be two (2) volts, while a high level signal would be four (4) volts. If four (4) combinations are used as illustrated herein, then an oil level corresponding to the lowest combination would generate a one (1) volt signal. As the oil level rises and each combination is triggered in axial succession, the total voltage signal from the sensor increases to two (2) volts, then three (3) volts, and finally four (4) volts.

The use of four (4) LED/phototransistor combinations provides added versatility to the system illustrated in FIG. 1. On option for the two additional combinations is to establish two more threshold levels. These two added threshold levels can be used for different high and low levels or to gauge oil consumption. The cumulative voltage is the indicator of which LED/phototransistor combination corresponds to the fluid level.

Figure 5:
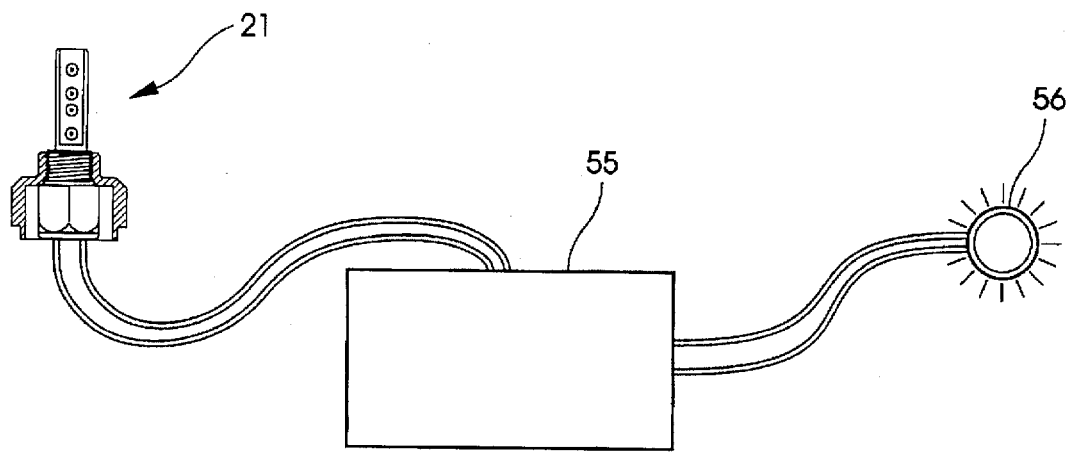
FIG. 5 is a diagrammatic illustration of the electrical connection between the FIG. 4 fluid level sensor, an electronic control module, and a warning indication lamp.

Fluid level sensor 21 provides three terminals in the base of housing portion 38 and these terminals include ground, supply, and output. When activated, the sensor 21 monitors the oil level in pan 20 based upon predetermined and calibrated criteria. When the engine is not running but the key is turned on, the system will check the oil level using the voltage signal from the LED/phototransistor combinations of sensor 21. Whenever the oil level is below a predetermined low oil level, there is in effect a predetermined voltage signal generated by sensor 21. Nevertheless, this voltage signal is still sent to the electronic control module (ECM) 55 for the vehicle (see FIG. 5). The ECM 55 is connected to the existing oil warning lamp (fluids lamps) 56 positioned in the cab of the vehicle. The ECM 55 with its cooperating electronics and circuitry responds to the voltage signal and is arranged to illuminate lamp 56 with a flashing mode of operation to signify a low oil condition. For a high oil condition, when the oil level is above a predetermined high level in the pan, lamp 56 will be illuminated in a steady or constantly on mode of operation. This mode of operation of lamp 56 is controlled by the ECM 55 and its response to the voltage signal received from sensor 21. An appropriate fault will be logged once per key-on event. It is important that the oil level sensor only function when the engine is not running.

One of the challenges with the present invention is to try and address the possibility that the corresponding vehicle will be tilted from front to back (power angle) or side to side as caused by road grade. This results in a shift from a true horizontal position for the oil level in the pan. Since the described arrangement is designed to yield a warning by way of lamp 56 only in response to the initializing key-on activation, the vehicle may be in a variety of orientations other than horizontal at the time of key-on activation. The oil level may also be influenced by temperature.

In an effort to address these concerns, tilt tests were conducted for each desired style of oil pan. Data points corresponding to various tilt lines were collected at various fluid levels and for various tilt angles. It was learned that the front to rear and rear to front power angle tilts did not all cross or intersect at the same point, though the general area of cross over was similar. The angle of tilt also had an effect on the location of the cross over point. The point where the oil levels cross is the point where the oil level is not sensitive to power angle fluctuations.

Figure 6:
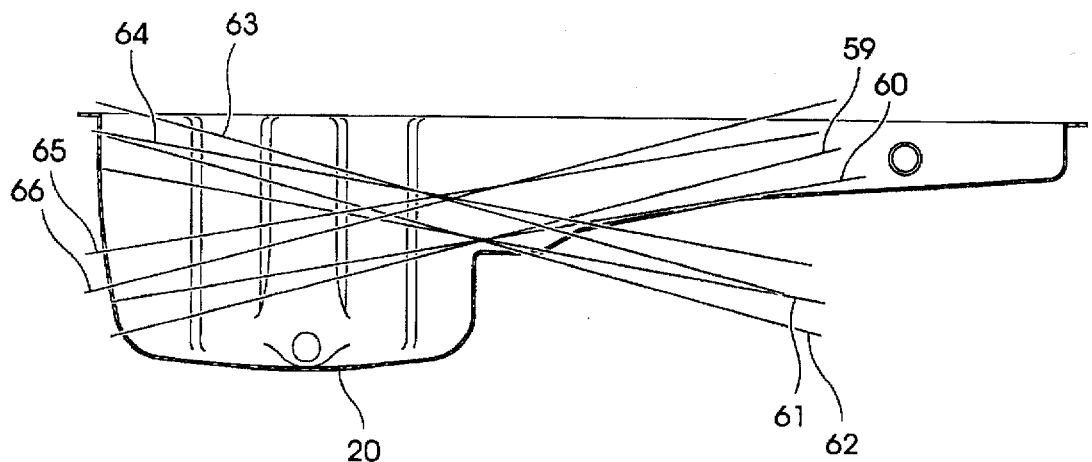
FIG. 6 is a diagrammatic illustration of the FIG. 1 oil pan indicating the orientation of the oil level under a variety of tilt conditions.

The illustration of FIG. 6 diagrammatically represents the type of tilt analysis just described. In FIG. 6 there are two angles of tilt of 10 degrees and 15 degrees for the front to rear power angle and for the rear to front power angle for a low level test of 7.5 gallons. These four oil level lines 59, 60, 61, and 62 are then repeated for a high oil level test where 9.5 gallons are present in the oil pan. These high level test results are depicted by oil level lines 63, 64, 65, and 66. What is seen by the tilt-analysis results is that the cross over point for the different volumes are offset (slightly) from each other. A compromise is thus in order and a decision needs to be made as to the most likely power angle and whether to optimize the design for either high or low level sensing or select a compromise position in between. Once the decisions are made, a location in the pan for aperture 30 can be selected. In the selection of the power angle and fluid level sensing to be optimized, another factor needs to be considered. This other factor is the location of the crank throws. It is important to position the fluid level sensor 21 between the crank throws and this could affect the precise positioning of the fluid level sensor.

As illustrated in FIG. 1, aperture 30 is located in a relatively flat portion of base wall 29 between the deeper portion 70 of the oil pan and the more shallow extension portion 71. Based upon the cross over points of different tilt angles and volume levels as illustrated in FIG. 6, this particular location for the sensor 21, which is adjacent to the various cross over points, is believed to be a valid compromise. However, if the cross over points happen to shift farther to the left (see FIG. 6) for example, an alternative mounting approach for sensor 21 needs to be considered.

One alternative is to form a boss in base wall 29 and secure to this boss an L-shaped conduit. The rise and run of this L-shaped conduit are selected so as to place its free end close to the center of the various cross over points. The free end of the L-shaped conduit is either fitted with a bushing similar to bushing 31 or is arranged to receive sensor 21 directly. This offset positioning of the sensor relative to the point of attachment of the sensor support to the oil pan 20 can be used with a point of attachment located in bottom wall 72 or in sidewall 73.

Figure 7:
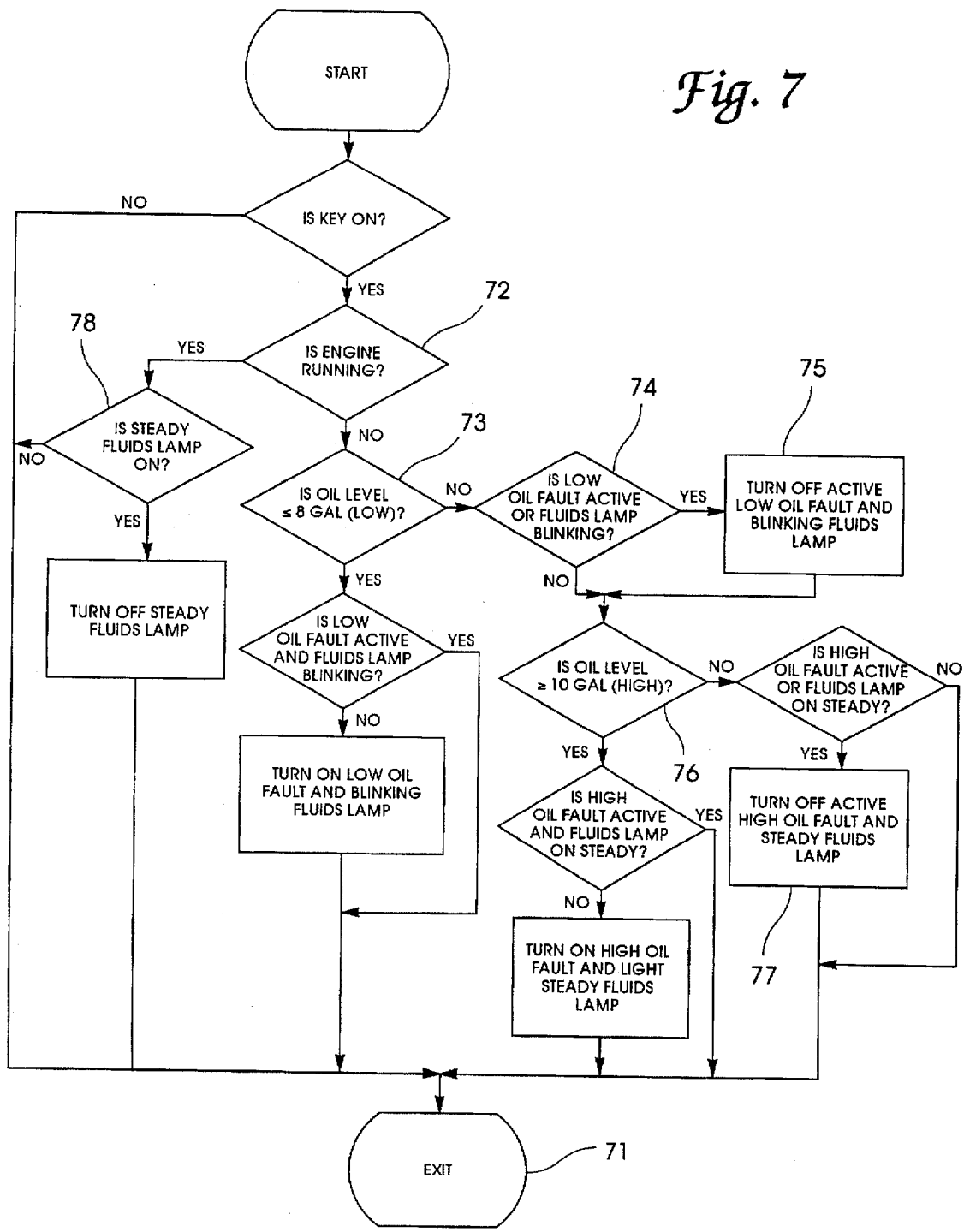
FIG. 7 is a flow diagram detailing the operational flow logic associated with the present invention.

Referring to FIG. 7 a flow logic diagram is provided for the oil level sensor system. This diagram details the decision process and the sequence of events associated with the electronic control module (ECM) and its algorithm as these relate to the present invention. The algorithm is programmed into the ECM so as to control is operation for the fluid sensing and lamp illumination of the present invention.

The ECM first senses and makes a determination of whether the key is on as the algorithm only runs during a key-on condition. If the key is not on, the algorithm goes to exit 71. As a practical matter the ECM is not normally powered unless the key is on, and thus the bypass to exit 71 will normally not occur. The next algorithm/ECM step 72 is to see if the engine is running. If the engine is not running, the ECM checks for a low oil level. At step 73, an eight (8) gallon level has been preselected, but this actual value will depend on the size and style of oil pan and the particular engine. If the sensed oil level is low based upon the preselected eight gallon level, the ECM checks to see if the low oil fault is active and the in-cab fluids lamp 56 is blinking. If this is the case, the algorithm goes to exit step 71. If this is not the case, then the ECM turns on the low oil level fault and the blinking fluids lamp and then exits. The blinking fluids lamp 56 alerts the driver that there is a fluids problem, in this case a low oil level. If multiple fluid levels in different parts of the engine are being sensed, then the fault buffer needs to be read to determine which fluid is causing the blinking fluids lamp.

If the oil level is not low (step 73), the ECM checks to see if the low oil fault is active or if the fluids lamp 56 is blinking (step 74). If either situation exists, it is not a correct reflection of the actual oil level and the ECM turns off the active fault and the blinking fluids lamp (step 75). If the low oil fault is not active and the fluids lamp 56 is not blinking, the algorithm goes to step 76.

At step 76 the ECM algorithm checks the oil level sensor to see if the oil level is higher than a preselected high oil level. In the FIG. 7 flow logic diagram, the high oil level has been set at ten (10) gallons. If the ECM determines that the actual oil level is above the preset high oil level, the ECM checks to see if the high oil fault is active and if the fluids lamp 56 is on steady (not blinking). If this is not the case, the ECM turns on the high oil level fault and illuminates (steady on) the fluids lamp and then exits at step 71. When the fluids lamp is on in a steady condition, the driver knows that there is a high fluid level problem, yet a high oil level condition is not as serious as a low oil condition. For this reason the high oil level steady-on fluids lamp will be turned off when the engine is running. If the fluids lamp 56 is to be used for indicating various fluid level conditions, a steady-on lamp will only indicate that one (or more) of the fluid levels being sensed is higher than the preset level. By reading the fault buffer the driver can determine which fluid level is too high.

If the oil level is not higher than the preset high oil level, the ECM checks to see if the high oil fault is active or if the fluids lamps is on steady. If this is the case, the ECM turns off the active fault and the steady fluids lamp (step 77) and then goes to exit. If the high oil fault is not active, the algorithm goes to exit step 71.

When the engine is running the ECM checks to see if the fluids lamp is on steady at step 78. If this is the situation the fluids lamp 56 is turned off. If the fluids lamp is not on steady, the algorithm directs the ECM to go to the exit step. The effect of this flow logic means that if a low oil level is found and the engine is started anyway, the driver will be confronted with a blinking fluids lamp until another engine off/key-on situation reveals that the level is not low. However, if the oil level is too high and the engine is started anyway, the driver will no longer see a steady fluids lamp 56 on for this fault. The fault will be recorded as inactive and be displayed at the next service check.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fluid level sensor system operable to indicate either when the fluid level in a movable reservoir is below a predetermined low level limit or when the fluid level in the reservoir is above a predetermined high level limit, said fluid level sensor system comprising:

a movable fluid reservoir which is constructed and arranged to be oriented in a plurality of different tilt angles, said plurality of different tilt angles defining a plurality of cross over points based upon the fluid level in said reservoir;

a fluid level sensor assembled to said fluid reservoir at a location which is adjacent to said cross over points and having first sensor means responsive to a low fluid level in said fluid reservoir for generating a first level signal and having second sensor means responsive to a high fluid level in said fluid reservoir for generating a second level signal;

an electronic control module electrically connected to said fluid level sensor for receiving and processing said first and second signals; and a warning indicator electrically connected to said electronic control module for providing a first warning signal corresponding to said first level signal and a second warning signal corresponding to said second level signal, said first warning signal being different from said second warning signal so as to differentiate between a low level fault and a high level fault.

2. The fluid level sensor system of claim 1 wherein the fluid is oil and wherein the fluid reservoir is an oil pan.

3. The fluid level sensor system of claim 2 wherein said fluid level sensor is an electronic arrangement of two LED/phototransistor sensors.

4. The fluid level sensor system of claim 3 wherein said warning indicator is a fluids lamp.

5. The fluid level sensor system of claim 4 wherein one of said first and second warning signals is a flashing mode of illumination from said lamp and the other warning signal is a constantly on mode of illumination from said lamp.

6. The fluid level sensor system of claim 1 wherein said fluid level sensor is an electronic arrangement of two LED/phototransistor sensors.

7. The fluid level sensor system of claim 1 wherein said warning indicator is a fluids lamp.

8. The fluid level sensor system of claim 1 wherein the operation of the electronic control module is controlled by an algorithm programmed into said electronic control module.

9. An oil level sensor for a movable vehicle oil pan for providing either a low oil level signal or a high oil level signal when the oil level in the oil pan is outside of an acceptable oil level range, the oil pan having the ability to assume different tilt angles, the tilt angles defining a plurality of cross over points based upon the fluid level in said vehicle oil pan, said oil level sensor comprising:

a main body portion constructed and arranged for assembly into said oil pan at a location which is adjacent to said cross over points; and an electronic module positioned within said main body portion and having a first LED/phototransistor sensor for sensing a low oil level in said oil pan and a second LED/phototransistor sensor for sensing a high oil level in said oil pan, said low and high oil levels being predetermined based upon oil pan geometry and volume.

10. The oil level sensor of claim 9 wherein said low oil level signal is a low voltage signal.

11. The oil level sensor of claim 10 wherein said high oil level signal is a high voltage signal which is higher than said low voltage signal.

12. A fluid level sensor system operable to indicate either when the fluid level in a movable reservoir is below a predetermined low level limit or when the fluid level in the reservoir is above a predetermined high level limit, said fluid level sensor system comprising:

a movable fluid reservoir which is constructed and arranged to be oriented in a plurality of different tilt angles, said plurality of different tilt angles defining a plurality of cross over points based upon the fluid level in said reservoir;

a fluid level sensor positioned within said fluid reservoir at a location which is adjacent to said cross over points and having first sensor which is responsive to a low fluid level in said fluid reservoir and which is constructed and arranged for generating a first level signal and having a second sensor which is responsive to a high fluid level in said fluid reservoir and which is constructed and arranged for generating a second level signal;

an electronic control module electrically connected to said fluid level sensor for receiving and processing said first and second signals; and a warning indicator electrically connected to said electronic control module for providing a first warning signal corresponding to said first level signal and a second warning signal corresponding to said second level signal and a second warning signal corresponding to said second level signal.

13. The fluid level sensor system of claim 12 wherein said first and second sensors are each an LED/phototransistor combination.

14. The fluid level sensor system of claim 13 wherein said warning indicator is a fluids lamp.

15. The fluid level sensor system of claim 12 wherein the operation of the electronic control module is controlled by an algorithm programmed into said electronic control module.

* * * * *